Oct. 15, 1957 D. W. MOLINS 2,809,638
MACHINES FOR MANIPULATING CUT TOBACCO
Filed Nov. 13, 1952 4 Sheets-Sheet 1

INVENTOR
Desmond W. Molins
BY Watson, Cole,
Grindle & Watson
ATTORNEYS

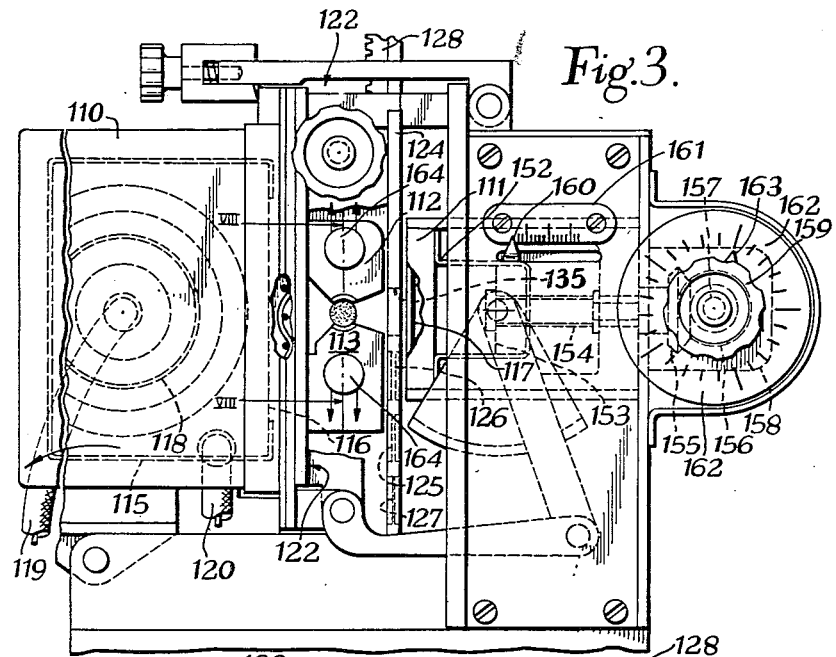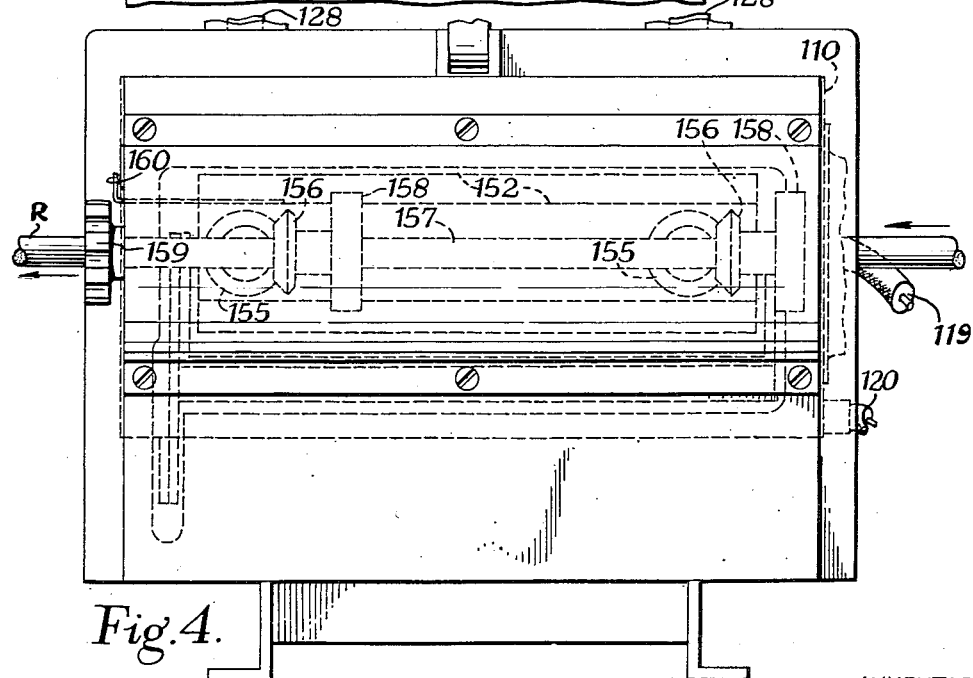

Oct. 15, 1957 D. W. MOLINS 2,809,638
MACHINES FOR MANIPULATING CUT TOBACCO
Filed Nov. 13, 1952 4 Sheets-Sheet 3

INVENTOR
Desmond W. Molins
BY Watson, Cole,
Grindle & Watson
ATTORNEYS

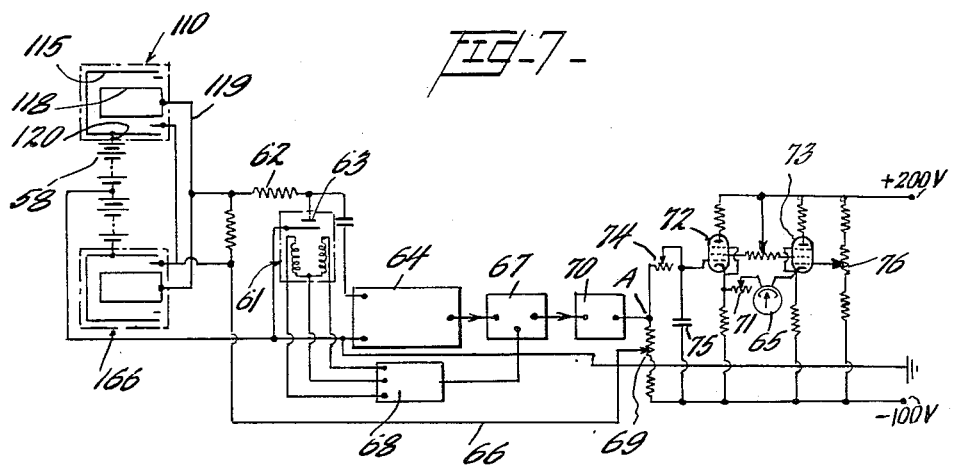
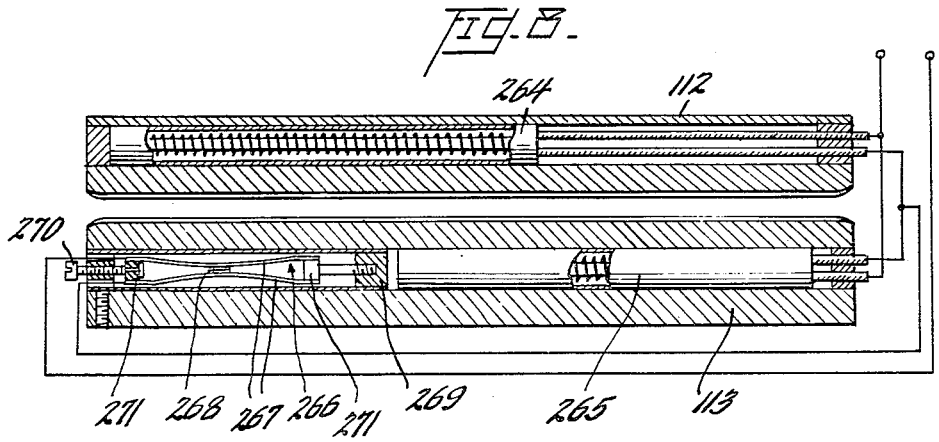

United States Patent Office 2,809,638
Patented Oct. 15, 1957

2,809,638
MACHINES FOR MANIPULATING CUT TOBACCO

Desmond Walter Molins, Deptford, London, England, assignor to Molins Machine Company Limited, Deptford, London, England, a British company Application November 13, 1952, Serial No. 320,281

19 Claims. (Cl. 131—21)

This invention concerns improvements in or relating to machines for manipulating cut tobacco and more particularly such machines when equipped with apparatus such as that described in United States patent applications, Serial Nos. 217,124, filed March 23, 1951, now Patent No. 2,704,079, granted March 15, 1955, Serial No. 303,636, filed August 11, 1952, and Serial No. 304,412, filed August 14, 1952, where the mass of a tobacco filler (including a wrapped rod) is measured by a measuring device which determines the absorption by the filler of rays from a radio-active source of penetrative radiation by means responsive to rays from said source (e. g. an ionization chamber). As explained in said specifications, it is technically desirable to use a balancing device. Such a balancing device could comprise a second source and means responsive to the rays from the source, with a piece of material interposed which has a ray absorption equivalent to that of the desired mass of the tobacco filler and to arrange the balancing device electrically in opposition to the measuring device so that any current resulting from the measurement is the difference between the currents in each device. A machine so equipped will be referred to hereafter as "a tobacco manipulating machine as specified."

It will be appreciated that in order to obtain satisfactory results from the use of a measuring device in cooperation with a balancing device, it is necessary that the difference between the results of the operation by the two devices should be a measure only of the deviation from the desired mass of the tobacco filler. It is found, however, that certain extraneous factors, caused by the operation of the machine and atmospheric conditions, can affect the absorption functions of either of the devices so as to affect the accuracy of the result produced by them jointly. For example, when the tobacco to be measured is carried on a tape, the rays in the measuring device pass through the tape, and the absorption by the tape changes as the tape wears away. Moreover, the tape may at times carry particles of material other than tobacco, for example particles of steel from the guides and other members which control the path and movement of the tape. Again, fine dust, such as is always present in cut tobacco, may in some constructions be liberated at the measuring device, and perhaps also at the balancing device, so as to remain, were it not for the present invention, in the ray path and affect the functioning of the device or devices. Further, particularly in a case where the rod is measured, there may be local heating at or in the region of the measuring device, due perhaps partly to the nearness of a rod heater for sealing the seam, partly to rod friction, and partly to the severe friction to which the garniture tape is subjected. The last two causes of heating are, of course, present even where the rod is not sealed but is, for example, crimped. The effect of heating in the locality of the measuring device is to cause an expansion of the heated parts so that the air gap through which the rays pass will change in size, and moreover the absorption properties of the heated air will also change.

Such factors which affect either of the two devices (i. e., the measuring device and the balancing device) are referred to herein and in the appended claims as extraneous factors.

According to the present invention, therefore, there is provided in a tobacco manipulating machine as specified, the combination of ray-actuated measuring and balancing devices and means to reproduce in the balancing device a ray-absorption effect that is equal or substantially equal to the corresponding ray absorption effect produced in the measuring device by one or more of the extraneous factors hereinbefore described. The purpose of such a combination is to ensure that the devices function jointly to determine mainly variations in the tobacco mass unaffected to any material extent by the said extraneous factors.

It is preferable to reproduce in the balancing device absorption effects that are substantially equal at all times to the corresponding absorption effects produced in the measuring device by all the material extraneous factors, though it will be appreciated that some of them may have such a small bearing on the results obtainable as to render unnecessary the balancing of such minor factors.

Further, according to the present invention, there is provided in a tobacco manipulating machine as specified, the combination of ray-actuated measuring and balancing devices and means to reproduce in the balancing device ray absorption effects that are equal or substantially equal at all times to the corresponding ray absorption effect produced in the measuring device by the hereinbefore described extraneous factors, whereby the devices function jointly to determine substantally only variations in the tobacco mass.

The said means may include arrangements for maintaining the temperature of the two devices at substantially the same value. The said arrangements may include means to control the temperature of the two devices thermostatically.

The said means may further include arrangements for guiding an unloaded part of a tape, which carries a filler through the measuring device, through the balancing device, and for forming the tape to, and maintaining it at, the same cross-section in both devices.

Means may be provided for cleaning the tape so that in each device the tape is of the same absorption value.

Where measurement is effected on a wrapped rod, the machine may comprise rod guides and heaters therefor in the measuring device, said heaters and guides being duplicated in the balancing device. The heaters may be controlled by thermostatic control means. The said thermostatic control means may be contained within the structure of the said rod guides.

Means may be provided for removing dust from between the source and said means responsive to rays from said source, in both the measuring device and the balancing device.

Further according to the present invention, there is provided in or for a machine for manipulating cut tobacco (e. g. a cigarette-making machine) apparatus comprising a radio-active ray source (e. g. a Beta-ray source) adapted to be positioned on one side of a stream of tobacco (e. g. a wrapped cigarette rod) moving through the machine, and means (e. g. an ionization chamber) responsive to rays from said source, adapted to be positioned on the opposite side of said stream, whereby currents are set up in said means by radiations passing through the tobacco stream so that the deviation from a desired mass of the mass of the tobacco stream between said source and said means can be measured, guides for the tobacco stream (e. g. guides spaced apart to mask part of the cross-section of the cigarette rod so as to restrict the passage of the radiations to the exposed part of the stream between the parts of the stream so masked), and means to heat said guides to a desired temperature. A thermostatic device may be provided for controlling the heating of the said guides so that the temperature to which the guides are raised by the heating means is thermostatically controlled. The said apparatus may be operated by setting the thermostats to control the heating means so as to maintain the measuring device at a temperature not lower than the "working temperature" as hereinafter defined. The reference to "one side" and "the opposite side" of a stream, as used above and in the appended claims, is not intended to be taken as referring only to horizontally opposite sides; the two "sides" might, for example, be vertically opposite.

The invention will be more fully described with reference to the accompanying drawings in which:

Figure 3 is an end elevation showing the mounting of an ionization chamber and ray source, as applied to the measurement of a wrapped cigarette rod, and associated devices for manipulating the chamber and source, some parts being omitted.

Figure 4 is an elevation looking at the righthand side of Figure 3.

Figure 7 is a diagram of the circuit associated with the Beta-ray measuring device.

Figure 8 is a cross-section on line VIII—VIII of Figure 3, showing details of heaters and a thermostat.

Figure 1:
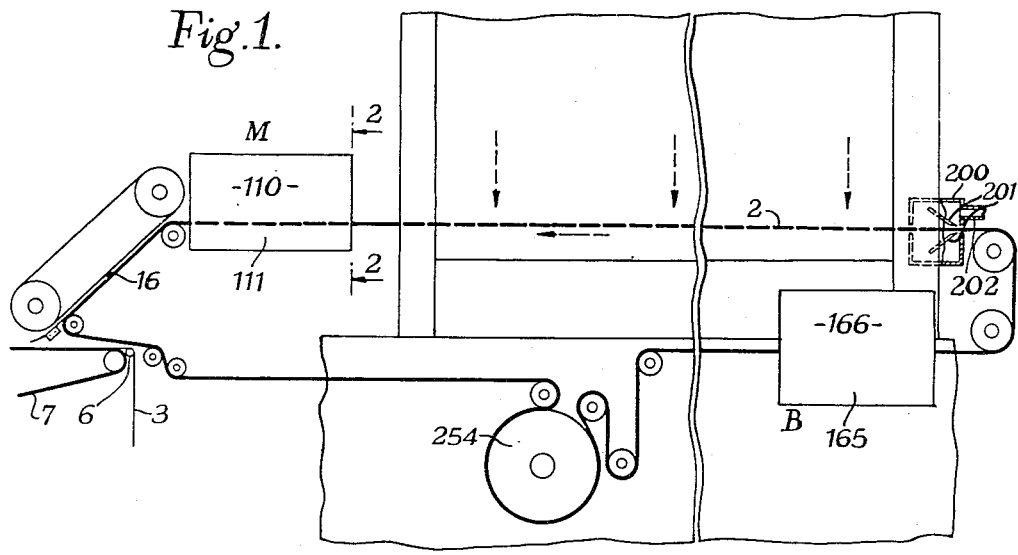
Figure 1 is a diagram of part of a tobacco manipulating machine as specified wherein measurement is made of a loose filler conveyed on a tape.
Figure 2:
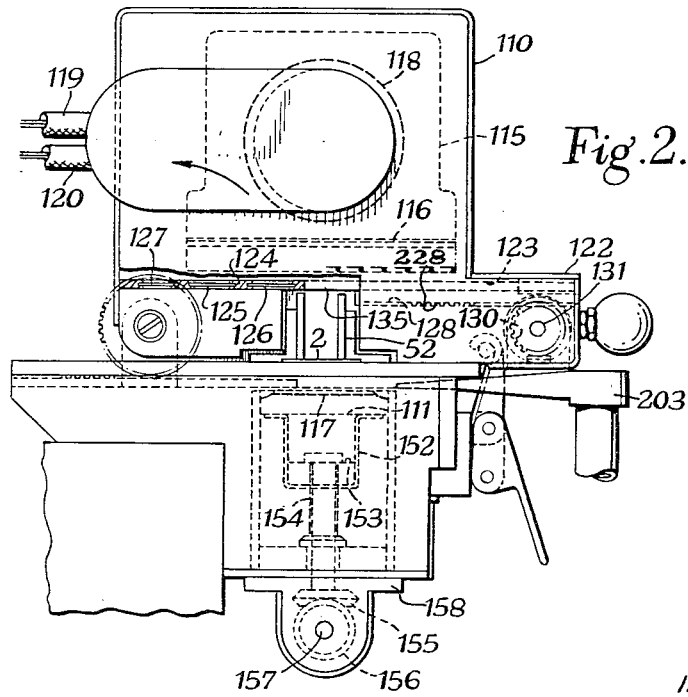
Figure 2 is a section of Figure 1 on the line 2—2 to a much larger scale, showing an end view of an ionization chamber and associated parts.
Figure 5:
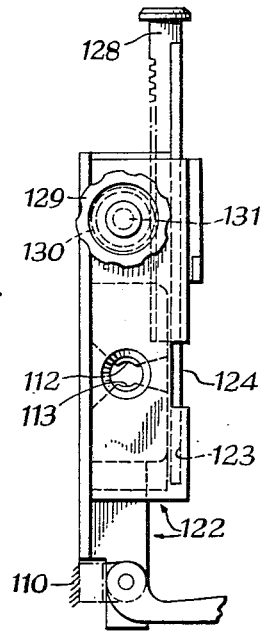
Figure 5 shows parts omitted from Figure 3.
Figure 6:
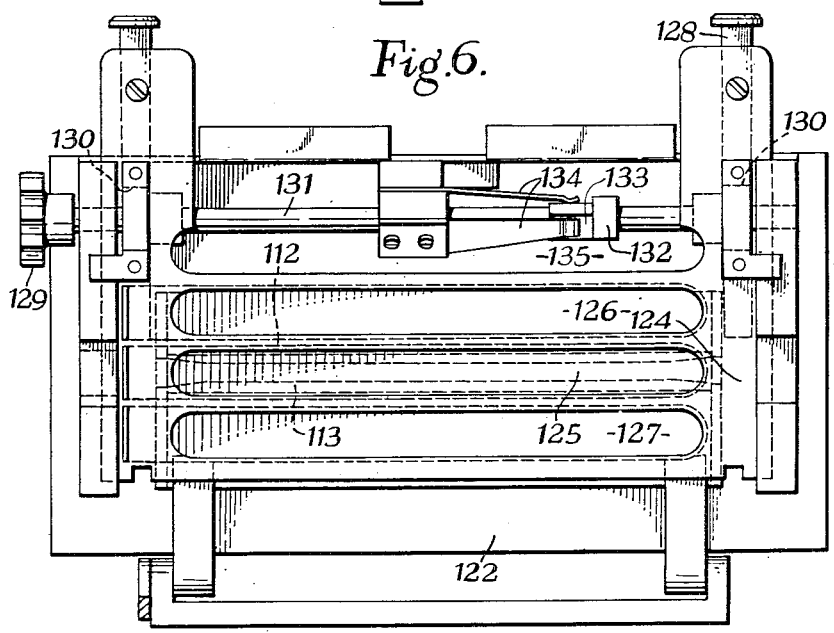
Figure 6 is an elevation looking at the righthand side of Figure 5.

Referring to the drawings, the parts illustrated in Figure 1 are copied substantially from Figure 1 of United States application, Serial No. 304,412 and the same references are used. Figure 2 corresponds to Figure 2 of United States application Serial No. 304,412 and such references as are used correspond with those in said specification. Similarly, Figures 3 to 6 are copied from United States application, Serial No. 303,636 though only those parts pertinent to the present invention are referred to below, using the same references as in the application referred to.

Referring first to Figure 1, tobacco is showered by a feeding apparatus 1 on to a hopper tape 2 which carries it through a smooth passage 16 and delivers it on to a paper web 3 which passes over a small roller 6 and then on to an endless tape 7 which conveys the loaded web through rod forming devices. The tape 2 is driven by a drum 254.

In order to measure the mass of the filler on the tape 2 there is provided at M a measuring device shown diagrammatically as consisting of a box 111 containing a ray source and a casing 110 containing an ionization chamber. At B there is provided a balancing device shown diagrammatically as consisting of a ray source in casing 165 and an ionization chamber in another casing 166. The slight difference in size of the devices M and B will be explained presently.

Referring now to Figures 2 and 7, inside the casing 110 is an inner casing 115 which constitutes the ionization chamber and has a thin metal window 116 through which the rays can pass. The chamber also functions as one electrode of the device. The box 111 is similarly provided with a window 117 through which rays can pass. Inside the ionization chamber 115 is an inner electrode 118. The chamber is hermetically sealed and contains air. Cables 119 and 120 connect the two electrodes to electrical apparatus shown in Figure 7 which amplifies the current to operate a meter showing the result of the measurement.

Between the chamber casing 110 and the box 111 there is provided an extension of the casing 110 constituting a holder 122, hereafter called a screen holder. The screen holder has grooves in it at 123 in which a screen frame 124, comprising three screens 125, 126 and 127 respectively can slide. The screen holder is broken away to show these screens. The screen holder lies against the face of the chamber casing 110, so that the screens are facing the ray source. The screen frame is slid to and fro in the grooves of the holder by means of rods 128 at each side of the frame which are provided with rack teeth 223 and engage pinions 130 on a small shaft 131 journalled across the screen holder 122 and provided with a knob (not shown) by which it can be rotated. On the shaft 131 there is fixed a cam or detent device identical with a device such as that including the parts 132, 133, 134 as shown in detail in Figure 6 and described later. As the knob is rotated and the frame is slid to and fro by the pinions and racks, the detent device will hold the screen frame in a definite position when the knob is released.

The screen frame comprises a series of apertures, for example, three, the middle one of which has a thin metal covering or screen 125 which is equivalent in absorption to the desired tobacco mass while the apertures to the right and left respectively of the middle one are provided with a thicker screen 126 and a thinner one 127 respectively. The thickness chosen depends on circumstances and the requirements of users, but conveniently the screen 126 offers as resistance to the passage of rays equivalent to that of a tobacco rod 4% denser than normal would offer while the screen 127 offers a resistance of 4% less than the normal rod. These screens may be made of Duralumin. There is a fourth aperture 135 without a screen.

In use the measuring device is operated with the fourth aperture in line with the filler.

Some other parts bearing references in Figure 2 are mentioned in the following description of Figures 3 to 6 where similar parts are used.

Figures 3 to 6 illustrate the invention as applied to measurement of the mass of a wrapped cigarette rod. These figures have parts similar to those already described with reference to Figure 2, bearing the same references and needing no further description. On the shaft 131, Figure 6, there is fixed a cam or detent device consisting of a cylinder 132 on which three flats 133 have been worked, each flat being a chord of the original circular section. These flats co-operate with stiff flat springs 134, fixed to the holder 122 so that as a knob 129 fixed to the shaft 131 is rotated and the frame is slid up and down by the pinions and racks, the cam 132—133 rotates and the engagement of the flat springs with the flats on the cam provides a detent which will hold the screen frame in a definite position when the knob 129 is released.

The ray source is adjustable towards and away from its ionization chamber and for this purpose, see Figures 3 and 4, the box 111 has fixed thereto a bracket 152 whose rear comprises a thick plate 153 which is threaded to receive two rotatable screws 154. These screws are fixed to bevel gear wheels 155 which are rotated by other bevel gear wheels 156 fixed on a shaft 157 journalled in bearings 158. A hand knob 159 is fixed to the shaft 157 and when the knob is rotated the box 111 is moved to and fro. A pointer 160 fixed to the bracket 152 travels over a scale 161 and subdivisions of the scale measurement are afforded by a dial 162 marked into suitable divisions, against which moves a pointer 163 fixed to the knob.

A wrapped cigarette rod is intended to be controlled by guides 112 and 113. Rod guides 112 and 113, spaced apart as shown, are provided to mask part of the cross-section of the cigarette rod R so as to restrict the passage of radiations to the exposed part of the rod which is between the parts of the stream masked by the guides. The purpose of thus masking parts of the rod is to avoid errors which might occur if the whole rod were scanned, as the rod is liable to move up and down slightly and to vary locally in diameter. In order to prevent condensation in the measuring device due to the moisture in the freshly sealed seam, rod heaters are provided at 164, Figure 3, and these may be thermostatically controlled.

The arrangement is illustrated in Figure 8. The guide 112 has a cartridge heater 264 in it and the guide 113 has a similar heater marked 265. In series with the supply to the two heaters, which are connected to the mains, is a thermostat 266. This is a well-known type having two springs 267 with contact studs 268. The springs do not materially expand or contract with temperature changes. The springs are fixed to insulators 271 and at the right-hand end the springs are fixed thereby to the thermostat housing 269 and at the other end they are adjustably fixed thereto by a screw 270. When the housing expands lengthwise with increasing heat, the pull on the springs straightens them and the contact studs 268 separate, thus cutting off the supply to the heaters.

The devices so far described are measuring devices since in Figure 2 the tape 2 passing through guides 52 is loaded with filler while in Figure 3 guides are provided for the rod and devices of the same construction are used as balancing devices.

The movable screen holder above described is used with the measuring device and an identical screen holder is provided for the balancing device. In other words, the measuring and balancing devices M and B, Figure 1, are identical in all respects so far as elements affecting radiation are concerned and save that the balancing device B, Figure 1, is so adjusted that in place of the tobacco passing through the measuring device M a metal screen, the screen 125, Figure 2, whose ray absorption is equivalent to that of the desired tobacco mass, is used in the balancing device.

As a measure of economy in manufacture the measuring chamber need not have the ray position adjustment so long as the balancing chamber is adjustable. This is why the devices M and B in Figure 1 differ in size.

In this case where measurement is made while loose tobacco is conveyed on a tape it will be appreciated that the rays pass through the tape.. The absorption by the tape changes with use because the tape wears away, particularly at first, and the pores of the tape tend to become filled with dirt, particles of tobacco and possibly particles of the metal (steel) of the guides and other members which control the path and movement of the tape.

The balancing device B, Figure 1, is therefore positioned to scan the tape at the place shown where the tape does not carry tobacco, and in this way the effect of the tape (in any condition or state of wear) in the measuring device is neutralized by its effect in the balancing device. In Figure 2 the tape is flat so only a simple flat guide is needed but it will be readily understood that if, as may sometimes be the case, the tape is of U section in the measuring device, the guiding arrangements in the balancing device will be such as to bring the tape to the same cross-section as in the measuring device.

In the case of a device having rod guides, as in Figure 3, similar guides are fitted in the balancing device and heaters and controls therefor identical with those in the measuring device are provided so as to keep the temperatures of the two devices equal, as the absorption would otherwise differ with differing temperatures.

The initial purpose of providing heaters in the measuring device was to prevent condensation since the vast majority of cigarette rods have a pasted seam and this arrives at the measuring device only a few inches away from the rod heater. But it will be appreciated that heating the rod guides introduces other factors such as expansion of the parts and heating of the air in the ray path, such factors naturally altering the length and absorption characteristics of the ray path and it is desirable to make arrangements to offset the effect of such changes. Also conditions are altered to some extent by heat due to rod friction (which would also apply to rods not sealed by paste) and heat dissipated from the rod after it leaves the rod heater of the machine and it is also necessary to consider the room temperature although in many factories this and the humidity are controlled fairly strictly.

All the factors recited above result in a condition which may be termed "working temperature" and for consistent results it is necessary that the measuring device shall be maintained substantially at this working temperature or preferably slightly above it. The balancing device will be kept in the same state.

Thus in the example described, the apparatus comprises a Beta-ray source and an ionization chamber adapted to be positioned on opposite sides of a wrapped cigarette rod moving through the machine, whereby currents are set up in the ionization chamber by radiations passing through the tobacco so that the deviation from a desired mass of the mass of tobacco in the chamber at any given instant can be measured, guides spaced apart to mask part of the cross-section of the cigarette rod so as to restrict the passage of the radiations to the exposed part of the stream between the parts of the stream so masked, means to heat said guides to a desired temperature, and a thermostatic device for controlling the heating of said guides so that the temperature to which the guides are raised by the heating means is thermostatically controlled, the thermostatic device being preferably set to maintain the measuring device at a temperature not lower than the "working temperature" as above defined.

By controlling the heaters in this way not only is condensation prevented but the absorption which would otherwise differ with differing temperature is maintained substantially constant.

When the device shown in Figure 3 is being used, the balancing device is operated with the screen 125 in position as in the earlier example but as the rod is wrapped the thickness of the screen is chosen if necessary to allow for the effect of the paper but the effect of the paper is very little.

Where a flat tape is scanned, a scraping device may be employed on an empty part of the tape 2 so that before it enters the measuring device the tape is cleaned and freed from previously collected dust or other foreign bodies which would interfere with the accuracy of the device. The scraping device is shown in Figure 1 and consists merely of a box 200 containing scrapers 201 and an outlet 202 leading to an exhaust system. The scraping device could be put before the tape enters the balancing device but the first mentioned position is better so that the tape enters the measuring device in a clean condition. Brushes could of course be used instead of scrapers. As a further safeguard against inaccuracy due to dust the measuring and balancing devices may be provided with blowers 203, such as that shown at Figure 2, which blow a jet of air across the face of each ray box and remove any dust therefrom. The blower is inserted into a slot between parts 122 and 111 and dust is blown out at the other side as indicated at 203A.

The measuring operation will now be described with reference to Figure 7.

The window in the casing 115 is positioned opposite the radio-active source in box 111 so that the rays that penetrate the cigarette rod pass into the chamber 115. A source of D. C. voltage, a battery 53, is applied between the inner and outer electrodes 118 and 115. The Beta particles that enter the chamber 115 cause ionization of the gas (air) in the presence of the applied potential and the resultant current, which is a measure of the energy of the rays penetrating the tobacco, develops a voltage across a resistance 60. This voltage must be amplified before it can be put to practical use, and because it is essentially a direct current, a form of D. C. amplifier is necessary.

It has been found most satisfactory to use a vibrating condenser electrometer 61 in which the input D. C. potential is first converted to A. C. by applying it through a resistance 62 to a condenser 63 the capacity of which changes at a suitable frequency (500 cycles). An A. C. voltage proportional to the D. C. input is developed across this condenser, which is passed into a conventional A. C. amplifier 64 and subsequently rectified.

The output voltage, in addition to energizing a direct reading meter 65 is applied to the input as negative feedback along line 66 and this allows considerable variations in the gain of the amplifier without any significant change in the output.

The balancing device consisting of the ray-source in casing 165 and ionization chamber in casing 166 is arranged for the desired weight of cigarette rod to pass a current equal and opposite to that from the chamber in the casing 110, measuring the density of the rod. The resistor 60 then only conducts the difference in the two currents and, at balance, small fluctuations in the value of this resistance are unimportant.

From the amplifier 64 current passes to a phase-sensitive rectifier 67 which works in synchronism with a maintaining circuit 68 for the vibrating condenser 61; by this means the output voltage developed at point A, Figure 7, across a cathode follower load resistance 69 which receives current from a cathode follower 70 and is normally at the same potential as the earth line, will change to a positive value or a negative value dependent on whether the output from the measuring chamber, in casing 110 relative to that from the chamber in casing 166 is greater or lesser; in addition the feed-back voltage which is developed across 69 is always fed back in the right phase.

The indicating meter 65 is connected in series with a variable resistance 71 (to control the sensitivity of the meter) between the cathodes of two tubes 72 and 73 forming a balanced valve voltmeter. The circuits of these tubes are arranged by adjusting resistance 76 so that with point A at earth potential the two cathodes are at the same potential and there is no current in the center-zero meter 65. The circuits of the phase-sensitive rectifier 67 and cathode follower 70 are also arranged so that when the output from the measuring chamber in casing 110 is the same as that from the chamber in casing 166, point A is at earth potential.

As a result, when the meter 65 is in the zero position the density of the cigarette rod is at the desired value and when this value varies, the indication on the meter will follow the change, a change of 1% in weight from the desired value causing full scale deflection, when the variable resistance 71 is set for maximum sensitivity.

An integrating circuit is provided between the amplifier and the measuring circuit so that the indication will be in accordance with the average density measured over a short period. This integrating circuit is formed by a resistance 74 and condenser 75. When the potential of point A changes, the control grid of tube 72 cannot follow immediately because of the large capacity of condenser 75 which must alter its charge, and the speed at which this takes place depends on the value of resistance 74 which is adjustable.

From the foregoing description it will be seen that the balancing device is so constructed that at all times it will balance the current in the measuring device provided that the mass of the filler is correct for by adjustment of the ray source by knob 159, the absorption by the screen 125 can be set exactly to balance the absorption due to the correct tobacco mass. If for any reason the machine is run without a filler or rod passing, the screen holders of both devices should be adjusted to match and then the net current should be zero. This is important to the electrical apparatus. The neutralization of the tape effect by passing the same tape through both devices and shaping it as necessary when passing through the balancing device is, however, important not only for current balancing but to ensure that changes in the condition of the tape do not affect the accuracy of the device. Thus the two devices will cause some absorption whether a filler is being measured or not and the purpose of the invention is to provide means whereby these absorption functions of the devices themselves are balanced at all times so that such differences in current as may be registered are solely due to, and an accurate measure of, the amount by which the filler mass differs from the desired mass.

What I claim as my invention and desire to secure by Letters Patent is:

1. In a cigarette-making machine, the combination of means to feed filler tobacco as a stream along a given path, measuring apparatus comprising a radio-active source positioned at one side of the path of said stream so as to project rays toward said stream, and means responsive to such rays, said measuring apparatus and the space through which said rays pass from said source to said responsive means constituting a measurement zone, and thermostatically controlled means directly associated with said measurement zone to maintain the latter at a constant temperature.

2. In a cigarette-making machine, the combination of means to feed filler tobacco as a stream along a given path, measuring apparatus comprising a radio-active source positioned at one side of the path of said stream so as to project rays toward said stream, and means responsive to such rays, said measuring apparatus and the space through which said rays pass from said source to said responsive means constituting a measurement zone, and thermostatically controlled heating means to heat the said measurement zone and maintain it at a constant temperature not lower than that to which it is raised by other causes during the operation of the machine.

3. A tobacco-manipulating machine as specified, comprising the combination of two separate ray-actuated measuring and balancing devices each comprising a radio-active ray-source and means responsive to rays from said source, the tobacco mass to be measured intercepting the path of rays in said measuring device only, and means to produce, in the region between the ray-source and responsive means in the balancing device, physical conditions the same as those existing in the region between the ray-source and responsive means in the measuring device, which conditions produce a ray-absorption effect extraneous to that produced by the tobacco mass to be measured, whereby the devices function jointly to determine substantially only variations in the tobacco mass.

4. A tobacco-manipulating machine as claimed in claim 3, wherein measurement is effected on a wrapped cigarette rod, and comprising guide members for said rod located in the said region on the measuring device, corresponding members in the said region in the balancing device, means to heat the said members in both devices, and thermostatic means for regulating the said heating means in both devices.

5. A tobacco-manipulating machine as claimed in claim 3, comprising a conveyor arranged to carry a tobacco mass through the said region in the measuring device and to pass in an unloaded condition through the said region in the balancing device, and means to maintain the unloaded part of the tape passing through the balancing device at the same cross-section as that of the loaded part of the tape passing through the measuring device.

6. A machine as claimed in claim 3, comprising a conveyor tape passing through each of the measuring and balancing devices, means to shower tobacco on to a part of said tape passing from the balancing device to the measuring device, so as to form on said part a tobacco filler, means to remove said filler from said tape after it has passed through the measuring device, and means, located between the balancing device and the said means to shower tobacco, to remove dust from the tape, whereby the quantity of dust on that part of the tape which passes through the balancing device is substantially the same as the quantity of dust, in addition to the tobacco to be removed from the tape, which is on the part of the tape which passes through the measuring device.

7. A machine as claimed in claim 3, comprising means for removing dust from the region between the ray-source and the responsive means in both the measuring device and the balancing device.

8. A machine as claimed in claim 3 comprising dust removing means for preventing dust from settling on the parts of the measuring and balancing devices between source and ionisation chamber, and in each device a ray source and ray collecting means associated therewith, the latter being exemplified by an ionization chamber.

9. A machine according to claim 3 comprising a conveyor tape passing through the measuring device and the balancing device and carrying a tobacco mass constituting a filler through the measuring device during a measuring operation, and the aforesaid means for balancing the absorption effects includes arrangements for guiding an unloaded part of the tape through the balancing device and maintaining the section of the unloaded part at the same cross-section as that of the loaded tape where it passes through the measuring device.

10. A machine as claimed in claim 3 in which measurement is made on a wrapped tobacco rod, said machine comprising guides to locate the rod in its passage through the measuring device, heaters for the guides, and means to duplicate this heating effect in the balancing device.

11. A machine according to claim 3 comprising a conveyor tape passing through the measuring and balancing devices and supporting a tobacco mass constituting a filler in the measuring device during a measuring operation, in combination with means for cleaning the tape to impart to it the same ray-absorption value in each device.

12. A tobacco manipulating machine as specified and according to claim 3, comprising a conveyor tape passing through the measuring device and the balancing device, a tobacco mass constituting a filler within the measuring device during a measuring operation, in combination with means for cleaning the tape to impart to it the same ray-absorption value in each device, and means including arrangements for guiding an unloaded part of the tape through the balancing device and maintaining the section of the unloaded part at the same cross-section as that of the loaded tape where it passes through the measuring device.

13. A tobacco manipulating machine as claimed in claim 3, having combined therewith dust removing means for removing dust from the operative portions of the measuring and balancing devices.

14. A tobacco manipulating machine as claimed in claim 3 having in combination means for heating parts associated with the measuring and balancing devices, and thermostatic means for regulating the said heating means.

15. A tobacco manipulating machine as claimed in claim 3 having in combination guides for a wrapped tobacco rod, located within the measuring device, means for heating parts of the measuring device, said heating means being contained within the structure of said guides, means to heat parts of the balancing device, and thermostatic means for regulating said heating means for the measuring and balancing devices.

16. In or for a cigarette making machine, apparatus comprising a radioactive ray source adapted to be positioned on one side of a stream of tobacco moving through the machine, and means responsive to rays from said source adapted to be positioned on the opposite side of said stream, whereby currents are set up in said means by radiations passing through the tobacco stream so that the deviation from a desired mass of the mass of the tobacco stream between said source and said means can be measured, guides for the tobacco stream, and means to heat said guides to a desired temperature.

17. Apparatus as claimed in claim 16 in which the said stream of tobacco consists of a wrapped cigarette rod, and in which the said guides are spaced apart to mask part of the cross-section of the cigarette rod so as to restrict the passage of the radiations to the exposed part of the rod between the parts of the rod so masked.

18. Apparatus as claimed in claim 16, comprising a thermostatic device for controlling the heating of the said guides so that the temperature to which the guides are raised by the heating means is thermostatically controlled.

19. Apparatus as claimed in claim 18, in which the thermostatic device is so set to control the heating means as to maintain the measuring device at a temperature level not lower than that to which it is likely to be raised by other causes during the operation of the machine.

References Cited in the file of this patent
UNITED STATES PATENTS

| Number | Name | Date |
|---|---|---|
| 472,101 | Bohls | Apr. 5, 1892 |
| 2,264,725 | Shoupp et al. | Dec. 2, 1941 |
| 2,488,269 | Clapp | Nov. 15, 1949 |
| 2,491,904 | Poole | Dec. 20, 1949 |
| 2,493,346 | Herzog | Jan. 3, 1950 |
| 2,525,292 | Fua et al. | Oct. 10, 1950 |
| 2,537,914 | Roop | Jan. 9, 1951 |
| 2,673,298 | Hutchins | Mar. 23, 1954 |
| 2,704,079 | Molins et al. | Mar. 15, 1955 |